Dec. 28, 1965 C. M. E. MASSON 3,226,701

ROTATING FLEXIBLE MAGNETIC DISC ASSEMBLY

Filed Aug. 22, 1962

Inventor —
Claude M. E. Masson
By Kemon, Palmer, Stewart + Estabrook
Attorneys

United States Patent Office 3,226,701

Patented Dec. 28, 1965

3,226,701

ROTATING FLEXIBLE MAGNETIC DISC ASSEMBLY

Claude Marie Edmond Masson, Asnieres, France, assignor to Societe d'Electronique et d'Automat Isme, Courbevoie, France Filed Aug. 22, 1962, Ser. No. 218,764

Claims priority, application France, Sept. 22, 1961, 874,028, Patent 1,308,059

11 Claims. (Cl. 340—174.1)

The present invention concerns improvements in or relating to magnetic stores of the kind wherein at least one flexible magnetic recording disc rotates in close proximity to a stationary annular member carrying write-in and read-out magnetic heads of the recording disc.

In prior binary coded magnetic stores of this type, the flexible disc was affixed to a rotating shaft and an adjustable air inlet was provided within the narrow air-gap between the disc and the annular head carrying member. The said inlet produced a depression which tended to apply the disc against the annular member whereas elastic forces internal to the disc material acted in a reverse way for opposing the application of the disc on the annular member; of course the centrifugal force maintained the disc in a substantially plane conformation.

Such a prior arrangement presents several drawbacks. First, the mechanical mounting of the disc and its adjustment with respect to the head carrier must be made with the utmost precision when the arrangement is assembled. Secondly, the basic material of the flexible disc must be selected for high flexible characteristics and the air inlet must be adjusted with respect to said flexibility characteristic of the disc; thirdly, the diameter of the disc is relatively restricted in order that the peripheral speed thereof is not too high; finally, it becomes impossible, in actual practice to mount several discs on the same shaft, each cooperating with a separate head carrier and air inlet, while such a multiple disc store would be of great advantage since the restricted diameter of the disc restricts the amount of content in binary information of a single disc.

It is an object of the present invention so to provide a store of the above defined kind that such drawbacks are substantially completely overcome.

According to the invention, a binary coded information store comprising a flexible disc rotating in close proximity to an annular magnetic head carrier is mainly characterized in that any flexible disc it incorporates is mounted for being simultaneously rotated by the drive of a shaft and axially displaceable automatically to come in close proximity to its magnetic head carrier under the control of a dynamic air-bearing established between said disc and said carrier. Said disc is subjected on its face opposite to that facing said carrier to an aerodynamic pressure adjusted for such an air-bearing effect. This effect may be easily understood by stating that, when the disc has come in quite close proximity to the carrier, an opposite force appears which balances the force applied to the disc for pressing it towards the carrier on its rear face (with respect to the said carrier).

The invention will be fully explained with reference to the accompanying drawings, wherein.

Figures 1, 2:
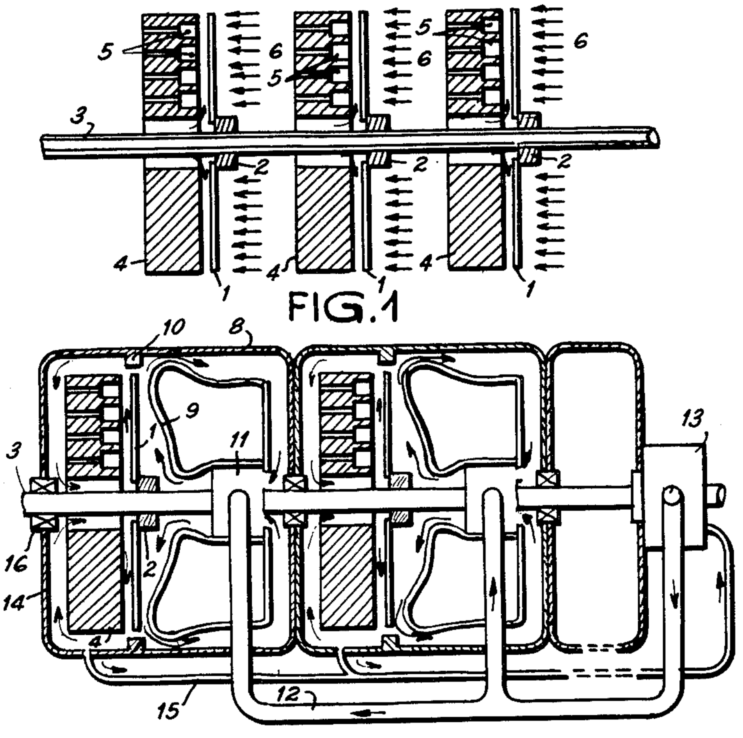
FIGURE 1 shows a magnetic store arrangement according to the invention.
FIG. 2 shows a preferred embodiment of such an arrangement.

Referring first to FIG. 1, three recording flexible discs 1 are affixed to hubs 2 carried on a grooved shaft so that each disc 1 while being rotated by the shaft is capable of moving axially with respect to said shaft. With each one of the discs 1, there is associated a fixed annular member 4 which carries magnetic write-in and read-out heads, arranged for instance along a radial direction in said member. Such heads are shown at 5. Each flexible magnetic disc 1 is pressed towards its associated head carrier member under a pressure 6 due to a fluid in stabilized flow. When the shaft 3 is rotated and the fluid pressure is applied to the discs, the latter move towards their associated head carriers upon which the pressure ought to apply them if, within each airgap 7, an air-bearing effect was not automatically produced, said air-bearing effect developing an opposing force between the carrier members and the discs through the very thin air lamina which circulates in a radial direction within said airgap as a result of the rotation of the discs with respect to the head carrier members. Such an air-bearing phenomenon occurs provided force 6 is preponderant in the system of forces existing in the arrangement, specially with respect to the internal elastic forces in the discs, in order that a stabilized condition of operation is reached in which each disc is substantially planar (so that its whole area may be used for recording information thereon). Obviously, prior to the rotation of the shaft, there is no critical value at all of the relative axial position of each disc (on its hub) on said shaft with respect to the corresponding head carrier member, and consequently there is no hard mechanical condition to be satisfied in this respect, when assembling the store. It is not imperative therefore to adjust with high precision the admission of the air inlet within each airgap and consequently as many pairs of discs and head carrier members can be provided along a single shaft as required for a defined capacity of contents of the store. In the accompanying drawings, three discs are shown, more can be provided when higher content stores are wanted. Further, with an arrangement according to the invention, each disc remains substantially planar and consequently the flexibility of its material is not a prime factor as in the prior art stores of this kind, which results in an easy choice of the material of said discs.

Electrostatic charges may casually appear on the neighboring surfaces of the discs and the head carrier members. These charges may be eliminated by coating the air gap surface of each disc with a thin layer of graphite and applying an A.C. potential difference between the two elements; said A.C. potential defference will be of a high value but will only result in a negligible intensity of the electrical current for the flow of the electrostatic charges, without any disturbance to the writing and reading of information in the store.

The generation of the force 6 may be either natural or forced (for instance from turbo-compressor means), each disc constituting a wall or partition of a nearly airtight enclosure. Said disc delineates an airgap face and within the enclosure there is created a circulation of pressurized fluid, preferably air.

In the embodiment of FIG. 2, each pair of flexible disc and head carrier is housed within an enclosure 8 and the disc 1, when rotating in its normal operative condition in close proximity to the head carrier 4, is encircled by a ring 10 supported by said enclosure so that a narrow circular airgap exists between said disc and said ring. A deflector 9 is set within said enclosure on the side of the disc opposite to the side facing the head carrier member 4. Said deflector 9 is suppled with pressurized air from a chamber 11 coaxial with the shaft, the air coming from a turbo-compressor 13 secured to the end of the shaft 3 of the store and distributing the compressed air through tubes 12 to the various enclosures. From the cooperation of the disc 1 and the ring 10, each enclosure is divided into a "high pressure" chamber containing the deflector 9 and a "low pressure" chamber 14 on the other side of the head carrier member. A low pressure return is provided at 15 to the compressor 13 from the low pressure chambers 14. Preferably, the enclosures and deflectors are stationary in order not to increase the inertia of the rotating part of the store, the shaft 3 passing through bearings such as 16 in the walls of said enclosures. The illustrated pattern of the deflectors 9 is so provided as to ensure a substantially uniform dynamic pressure of the air flowing on the flexible discs 1. The dynamic paths for the high and low pressure flows are indicated by arrows; in the high pressure paths, the air return has been shown on the chambers 11, it may also be provided for by slots in the rear walls of the enclosures (as it may also be provided for the returns in the low pressure chambers). However, working in closed circuits or paths enables a better control of the overall operation since the returns in closed paths may be provided with manually adjustable gates if and when required.

Figures 3, 4:
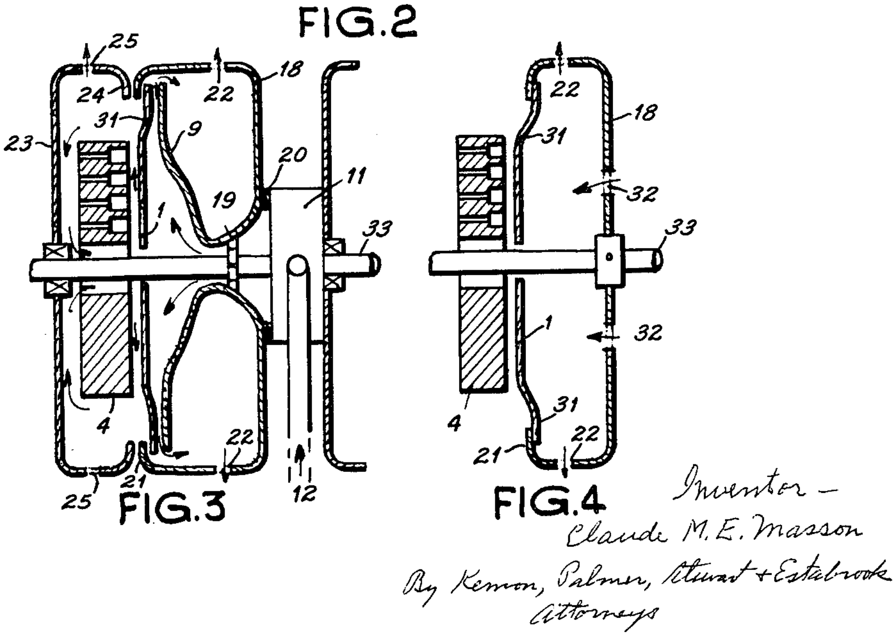
FIG. 3 shows a modification of FIG. 2.
FIG. 4 shows a further modification of FIG. 2.

Instead of supporting the flexible discs by hubs mounted on a grooved shaft, each disc 1, as shown in FIG. 3, may be left floating within an enclosure constituting a driving cage, such as shown at 18, said cage being secured to the shaft by radial members such as 19. The shaft 33 in this instance does not need to be grooved. Said cage 18 comprises the deflector 9 and is air fed through the distributing box 11 through an annular airtight joint 20. The returns are shown as provided by mere openings such as 22 in said cage 18. The enclosure or box 23 defining the low pressure chamber on the other side of the disc, and enclosing the head carrier member 4, may be stationary, as shown, and provided with openings such as 25 for low pressure returns. The edges 21 and 24 of the enclosures 18 and 23 come in close proximity and, when required, a rotating annular joint may be provided between said edges. Aspiration openings may further be provided in the box 23 when required, though the inner circular spacing between the disc 1 and the shaft will practically suffice for the admission of air within said box. When cage 18 is driven, and pressurized air admitted from 12, the flexible floating disc 1 is applied by its outer edge against the edge 21 of the cage 18, the outer edge of the disc 1 is slightly distorted as shown at 31 so that the disc in its useful portion comes quite close to the head carrier member 4 of smaller diameter than the disc, the air-bearing effect is produced from these elements as well as in the embodiment of FIG. 2. Consequently the disc is brought planar in quite close relation to the surface of the head carrier member 4, and the airgap is automatically adjusted and maintained to such very narrow thickness. The flexibility of the disc only allows for the distortion of the edge 31 and does not take any part in an equilibrium of forces so that there is not any condition in the choice of the flexible material of the disc.

A simplified form, FIG. 4, may then be provided, wherein no low pressure chamber is created, consequently box 23 is omitted, and the pressure of the air against the face of the flexible disc opposite to the head carrier member is created only by calibration of admission openings 32 in the cage enclosure 18 and of evacuation openings 22 in said enclosure. The air-bearing effect may thus be obtained as hereinbefore explained, any compressor being omitted in the embodiment of the store.

I claim:

1. A binary coded information store comprising in combination:

(1) a flexible magnetic disc for the storage of information thereon;

(2) an annular magnetic read-out, read-in head carrier;

(3) means mounting said disc for rotation about its center on the axis of said head carrier and in close proximity thereto, said means further permitting axial movement of the entirety of said disc simultaneously with its rotation;

(4) and means operative during rotation of said disc for establishing a dynamic fluid pressure urging said disc toward said head carrier and also an air bearing between said disc and said head carrier to prevent contact therebetween.

2. A binary coded information store comprising in combination:

(1) a flexible magnetic disc for the storage of information thereon;

(2) an annular magnetic read-out, read-in head carrier;

(3) a shaft on the axis of said head carrier;

(4) means mounting said disc on said shaft for rotation therewith and for axial movement of the entirety of said disc therealong;

(5) and means operative during rotation of said shaft for establishing a dynamic fluid pressure urging said disc axially of said shaft toward said head carrier and also creating an air bearing between said disc and said carrier to prevent contact therebetween.

3. A binary coded information store as defined by claim 2 in which said last-mentioned means comprises a pressurized fluid enclosure having an annular ridge on the inner surface thereof and in which said disc cooperates with said annular ridge for substantially defining a nearly closed partition adjacent said carrier.

4. A binary coded information store as defined by claim 3 in which said enclosure is mounted on said shaft for rotation therewith and said disc floats around said shaft and is arrested by said annular ridge in said enclosure for being driven into rotation therewith.

5. A binary coded information store as defined by claim 3 including a low pressure enclosure for said carrier and means for feeding said low pressure enclosure with fluid from said other enclosure, said means being limited by said disc on the face of said carrier.

6. A binary coded information store according to claim 3, wherein the said enclosure is stationary, said shaft is grooved and said disc is supported on said shaft by means of an internally grooved hub.

7. A binary coded information store according to claim 3, wherein the said enclosure consists of a chamber surrounding said disc.

8. A binary coded information store according to claim 3, including a deflector housed within said enclosure on one side of said disc opposite to that facing said carrier, for uniformly distributing the fluid pressure against said side of said disc.

9. A binary coded information store according to claim 3, wherein a compressed fluid is introduced within said enclosure for urging said disc toward said carrier.

10. A binary coded information store as defined by claim 9 including a turbo-compressor secured to said shaft for supplying said pressurized fluid.

11. A binary coded information store according to claim 9, wherein the degree of compression of the fluid is effected within the said enclosure by a predetermined dimensioning of inlet and outlet openings therein.

References Cited by the Examiner

UNITED STATES PATENTS

| | | | |
|---|---|---|---|
| 2,950,353 | 8/1960 | Fomenko | 179—100.2 |
| 3,001,850 | 9/1961 | Marrs | 340—174.1 |
| 3,029,416 | 4/1962 | Quade | 340—174.1 |
| 3,108,259 | 10/1963 | Perkins et al. | 340—174.1 |
| 3,110,889 | 11/1963 | Morley | 340—174.1 |

OTHER REFERENCES

Pearson, "Flexible-Disk Storage," Instruments and Control Systems, pp. 1055, 1056, June 1961.

IRVING L. SRAGOW, *Primary Examiner.*